(12) United States Patent
Tsutsumi et al.

(10) Patent No.: US 8,397,869 B2
(45) Date of Patent: Mar. 19, 2013

(54) LADDER DEVICE FOR CONSTRUCTION MACHINE

(75) Inventors: Katsuhiro Tsutsumi, Kawagoe (JP); Yu Sakon, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/503,124

(22) PCT Filed: Jun. 30, 2011

(86) PCT No.: PCT/JP2011/065000
§ 371 (c)(1),
(2), (4) Date: Apr. 20, 2012

(87) PCT Pub. No.: WO2012/035848
PCT Pub. Date: Mar. 22, 2012

(65) Prior Publication Data
US 2012/0205195 A1    Aug. 16, 2012

(30) Foreign Application Priority Data

Sep. 14, 2010  (JP) ................................. 2010-205352

(51) Int. Cl.
*E06C 5/00* (2006.01)
(52) U.S. Cl. ....................................................... 182/127
(58) Field of Classification Search .................. 182/127, 182/85, 86, 106; 280/163, 164.1, 166
See application file for complete search history.

(56) References Cited

U.S. PATENT DOCUMENTS

| | | | |
|---|---|---|---|
| 3,047,093 A * | 7/1962 | Cruz | ................................. 182/97 |
| 3,912,298 A | 10/1975 | Humphrey | |
| 5,397,143 A | 3/1995 | Bird | |
| 6,981,572 B2 * | 1/2006 | Hedley | ............................ 182/95 |
| 2007/0256893 A1 * | 11/2007 | Horn et al. | ..................... 182/127 |
| 2009/0038885 A1 | 2/2009 | Ellement | |
| 2009/0065301 A1 | 3/2009 | Ellement | |

FOREIGN PATENT DOCUMENTS

| | | |
|---|---|---|
| JP | 9-278364 A | 10/1997 |
| JP | 10-328239 A | 12/1998 |
| JP | 2006-298282 A | 11/2006 |
| JP | 2008-240278 A | 10/2008 |
| JP | 2008-546576 A | 12/2008 |
| JP | 2009-517265 A | 4/2009 |
| JP | 3157415 U | 1/2010 |
| JP | 2010-116762 A | 5/2010 |
| JP | 2010-150835 A | 7/2010 |

OTHER PUBLICATIONS

International Search Report of corresponding PCT Application No. PCT/JP2011/065000.

* cited by examiner

*Primary Examiner* — James O Hansen
*Assistant Examiner* — Kristine Florio
(74) *Attorney, Agent, or Firm* — Global IP Counselors

(57) ABSTRACT

A ladder device includes a ladder main body, a hand railing, a driving mechanism and a coupling member. One end of the coupling member is pivotably supported by the ladder main body, while the other end thereof is pivotably supported by the hand railing. The coupling member is configured to: position the hand railing between the ladder main body and a walkway when the ladder main body takes the deployed posture; pivot the hand railing in conjunction with a pivot action of the ladder main body from the deployed posture to the retracted posture; and position the hand railing further inwards of the vehicle body than the ladder main body is when the ladder main body takes the retracted posture.

9 Claims, 14 Drawing Sheets

LADDER DEVICE FOR CONSTRUCTION MACHINE

CROSS-REFERENCE TO RELATED APPLICATIONS

This application claims priority to Japanese Patent Application No. 2010-205352, filed on Sep. 14, 2010, the disclosure of which is hereby incorporated herein by reference in its entirety.

TECHNICAL FIELD

The present invention relates to a ladder device, particularly to a ladder device for climbing up to and climbing down from a walkway mounted on a vehicle body of a construction vehicle.

BACKGROUND ART

In large wheel loaders, for instance, a cab is disposed at a high position and a walkway as a communication path to the cab is disposed below the cab. Further, a ladder device is disposed between the walkway and the ground. For example, the ladder device herein employed is either a stationary ladder devices fixed to a vehicle-side member or a movable ladder device configured to be pivoted between a retracted position and a deployed position in usage.

The movable ladder device includes a ladder main body having steps. The ladder main body is pivotable up and down between a deployed posture in usage and a retracted upright posture while the upper end thereof is pivotably supported by a vehicle-side member.

For example, Publication of Japanese Translation of PCT International Application No. JP-A-2008-546576 describes an example of the aforementioned movable ladder device. The ladder device described in the above mentioned publication will be explained with reference to FIG. 13. The ladder device illustrated in FIG. 13 includes a ladder main body 60, a pair of hand railings 61 disposed on an upper part of the ladder main body 60 and a pair of right and left actuation cylinders 62. The hand railings 61 are fixed to a vehicle body. Further, the ladder main body 60 is pivotable between the deployed posture and the retracted posture in conjunction with actuation of the pared right and left actuation cylinders 62. Specifically, the ladder main body 60 is pivoted in the counterclockwise direction in FIG. 13 in conjunction with extension of piston rods of the actuation cylinders 62. Thus, the ladder main body 60 can be retracted. By contrast, the ladder main body 60 is pivoted in the clockwise direction in FIG. 13 in conjunction with contraction of the piston rods. Thus, the ladder main body 60 can take the deployed posture. FIG. 13 illustrates a transitional state of the ladder main body 60 shifting from the deployed posture to the retracted posture.

SUMMARY

In the ladder device of the above mentioned publication, the hand railings 61 are fixed to the vehicle body. The hand railings 61 are thereby partially protruded outwards of the ladder main body 60 even when the ladder main body 60 takes the retracted posture. Due to the structure, the part of the hand railings 61, protruded outwards of the vehicle body, may make contact with and be damaged or broken by an obstacle during actuation of the vehicle.

Further, placement of the ladder main body may be restricted depending on vehicle types. For example, when the ladder main body 60 of the above mentioned publication is disposed on the rear side of a vehicle, the hand railings 61 are partially protruded outwards of the revolving radius of the vehicle. This increases chances that the protruded part of the hand railings 61 may contact with and be damaged or broken by an obstacle. Therefore, an operator is required to be careful not to allow the protruded part of the hand railings 61 to make contact with an obstacle.

It is an object of the present invention to provide a ladder device for a construction machine, which is configured to prevent a hand railing from being protruded outwards of a ladder main body when the ladder main body takes a retracted posture.

A ladder device for a construction machine according to a first aspect of the present invention is a movable device for climbing up to and climbing down from a walkway mounted on a vehicle body of the construction machine. The ladder device includes a ladder main body of a movable type, at least a hand railing of a movable type, a driving mechanism and at least a coupling member. The ladder main body has a first end and a second end. The first end is supported pivotably about a first pivot shaft by the vehicle body. Further, the ladder main body is configured to take either a deployed posture of positioning the second end on a ground side or a retracted posture of directing the second end upwards. The hand railing is disposed on at least either of right and left sides of the ladder main body. The hand railing has a bottom end supported pivotably about a second pivot shaft by the vehicle body. The driving mechanism is configured to move the ladder main body between the deployed posture and the retracted posture. The coupling member has a first end and a second end. The first end is supported pivotably about a ladder side fulcrum by the ladder main body, while the second end is supported pivotably about a hand railing side fulcrum by the hand railing. Further, the coupling member is configured to position the hand railing between the ladder main body and the walkway when the ladder main body takes the deployed posture. The coupling member is configured to pivot the hand railing in conjunction with a pivot action of the ladder main body from the deployed posture to the retracted posture. The coupling member is configured to position the hand railing further inwards of the vehicle body than the ladder main body is when the ladder main body takes the retracted posture.

According to the ladder device of the first aspect of the present invention, the first end of the ladder main body is pivotably supported by the vehicle body. When the ladder main body takes the deployed posture, the second end of the ladder main body is positioned on the ground side. Further, the bottom end of the hand railing is pivotably supported by the vehicle body. The hand railing is positioned between the ladder main body and the walkway when the ladder main body takes the deployed posture. When the second end of the ladder main body is upwardly pivoted by means of the driving mechanism, the hand railing is pivoted by means of the coupling member in conjunction with the pivot of the ladder main body. When the ladder main body is retracted, the hand railing is positioned inwards of the ladder main body taking the retracted posture.

When the ladder main body is herein pivoted from the deployed posture to the retracted posture, the hand railing is similarly pivoted and retracted to the vehicle body side. When the hand railing is retracted, the hand railing is positioned inwards of the ladder main body taking the retracted posture. Therefore, the hand railing is prevented from protruding outwards of the vehicle body and is thereby prevented from hitting an obstacle.

A ladder device for a construction machine according to a second aspect of the present invention relates to the ladder device for a construction machine according to the first aspect of the present invention. In the ladder device, both of the ladder side fulcrum and the hand railing side fulcrum of the coupling member are set to be outwards of the vehicle body than the first pivot shaft and the second pivot shaft are when the ladder main body takes the deployed posture. Further, a sum of a distance between the first pivot shaft and the second pivot shaft and a pivot radius of the ladder side fulcrum of the coupling member about the first pivot shaft is less than or equal to a sum of a side-view length between the ladder side fulcrum and the hand railing side fulcrum of the coupling member and a pivot radius of the hand railing side fulcrum of the coupling member about the second pivot shaft.

The respective pivot shafts and fulcrums are thus set and the inter-fulcrum length of the coupling member is set. Therefore, the ladder main body and the hand railing can be smoothly pivoted between the deployed posture and the retracted posture.

A ladder device for a construction machine according to a third aspect of the present invention relates to the ladder device for a construction machine according to one of the first and second aspects of the present invention. In the ladder device, the ladder main body is configured to be slanted at a first angle with respect to a horizontal plane when the ladder main body takes the deployed state. The ladder main body is configured to be pivoted and raised at an angle obtained by adding an angle of 90 degrees to the first angle when the ladder main body takes the retracted posture. Further, the hand railing includes a vertical member and a horizontal member. The vertical member is configured to be positioned adjacent to and extended substantially perpendicular to the ladder main body when the ladder main body takes the deployed posture. The horizontal member is configured to be extended substantially in parallel to the ladder main body when the ladder main body takes the deployed posture. Further, the vertical member of the hand railing is configured to be positioned further inwards of the vehicle body than the ladder main body is when the ladder main body takes the retracted posture.

When the ladder main body is herein pivoted from the deployed posture to the retracted posture, the ladder main body is pivoted by an angle of greater than or equal to "the first angle+90 degrees". In this case, the vertical member of the hand railing disposed adjacent to the ladder main body, i.e., the vertical member positioned outermost of the vehicle body is retracted further inwards of the vehicle body than the raised ladder main body taking the retracted posture. Therefore, the hand railing is prevented from protruding outwards of the vehicle body than the ladder main body is when the ladder main body and the hand railing are retracted.

A ladder device for a construction machine according to a fourth aspect of the present invention relates to the ladder device for a construction machine according to the third aspect of the present invention. In the ladder device, a straight line connecting the second pivot shaft and the hand railing side fulcrum is configured to be arranged substantially perpendicularly to the ladder main body when the ladder main body takes the deployed posture. Further, the straight line connecting the second pivot shaft and the hand railing side fulcrum is configured to be extended in a substantially vertical direction when the ladder main body takes the retracted posture.

A ladder device for a construction machine according to a fifth aspect of the present invention relates to the ladder device for a construction machine according to one of the first to fourth aspects of the present invention. In the ladder device, the walkway is provided with a safety fence. The ladder main body includes a pair of side plates and a pair of banisters. The side plates are configured to be extended towards the ground from the walkway when the ladder main body takes the deployed posture. The banisters are respectively supported by the paired side plates. Further, the hand railing includes a first part and a second part. The first part has an engaging portion. The engaging portion is configured to be engaged with the safety fence when the ladder main body takes the deployed posture. The second part is disposed adjacent to a corresponding one of the banisters.

A ladder device for a construction machine according to a sixth aspect of the present invention relates to the ladder device for a construction machine according to the fifth aspect of the present invention. In the ladder device, the hand railing is configured to be retracted within a height dimension of the ladder main body including the banisters when the ladder main body takes the retracted posture.

A ladder device for a construction machine according to a seventh aspect of the present invention relates to the ladder device for a construction machine according to one of the first to sixth aspects of the present invention. In the ladder device, the hand railing further includes a stopper having an elastic material. The elastic material is configured to make contact with a walkway side member when the ladder main body takes the retracted posture.

A ladder device for a construction machine according to an eighth aspect of the present invention relates to the ladder device for a construction machine according to one of the first to seventh aspects of the present invention. In the ladder device, the driving mechanism includes a hydraulic cylinder, a first link member and a second link member. The hydraulic cylinder has a base end pivotably supported by the vehicle body. The first link member has a first end and a second end. The first end is pivotably supported by the vehicle body. The second end is extended outwards of the vehicle body. The first link member is configured to be pivoted in conjunction with extension and contraction of the hydraulic cylinder. The second link member has a first end and a second end. The first end of the second link member is supported pivotably about a first pivot fulcrum by the second end of the first link member. The second end of the second link member is supported pivotably about a second pivot fulcrum by the ladder main body. The second link member is configured to convert a pivot action of the first link member into a pivot action of the ladder main body.

A ladder device for a construction machine according to a ninth aspect of the present invention relates to the ladder device for a construction machine according to the eighth aspect of the present invention. In the ladder device, the second pivot fulcrum is positioned further outwards of the vehicle body than a straight line connecting the first pivot shaft and the first pivot fulcrum is when the ladder main body takes the deployed posture.

With the setting of the pivot shaft and the pivot fulcrums, the ladder main body can be pivoted from the deployed posture to the retracted posture by means of the actuation of the hydraulic cylinder.

A ladder device for a construction machine according to a tenth aspect of the present invention relates to the ladder device for a construction machine according to one of the eighth and ninth aspects of the present invention. In the ladder device, the second link member is a vertically elongated member for positioning the first pivot fulcrum lower than the second pivot fulcrum in a side view. The second link member is configured not to be protruded further outwards of the vehicle body than the ladder main body is when the ladder main body takes the retracted posture.

According to the present invention as described above, the hand railing is prevented from protruding outwards of the ladder main body when the ladder main body takes the retracted posture. Therefore, the hand railing can be prevented from hitting an obstacle and being thereby damaged.

DESCRIPTION OF THE EMBODIMENTS

A preferred exemplary embodiment of the present invention will be hereinafter specifically explained with reference to attached figures. A wheel loader will be hereinafter explained as an exemplary construction machine. However, the present invention can be similarly applied to the other construction machines such as hydraulic excavators.

First Exemplary Embodiment

Arrangement and Overall Structure of Ladder Device

Figure 1:
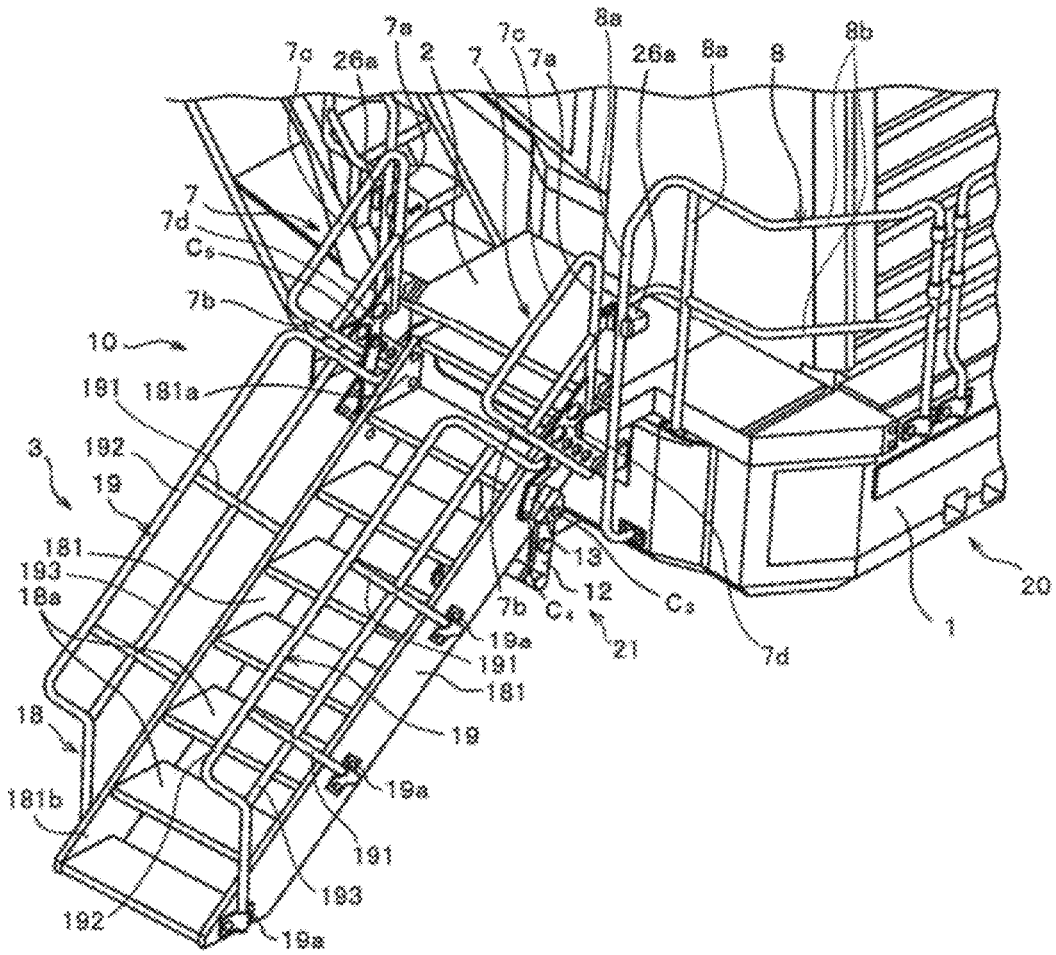
FIG. 1 is a perspective view of major elements illustrating a deployed state of a ladder device according to an exemplary embodiment of the present invention.

As illustrated in FIG. 1, a ladder device 3 is disposed for allowing an operator to climb up to a walkway 2 of a wheel loader 20 from the ground and climb down to the ground from the walkway 2. A staircase is connected to the walkway 2 for allowing an operator to climb up to a cab (not illustrated in the figures) disposed in a further upward position. The structure of the walkway 2 is not limited to a type of walkway connected to a staircase ahead. The walkway 2 may be structured as a landing connected to a door of the cab or the ladder device 3.

As illustrated in FIGS. 1 to 6, the ladder device 3 includes a movable ladder main body 18, a pair of movable hand railings 7 and a pivot mechanism 21 for pivoting the ladder main body 18 and the hand railings 7. The pivot mechanism 21 includes a hydraulic cylinder 4, a first link mechanism 5 and a second link mechanism 6. Both of the ladder main body 18 and the hand railings 7 are movable between a deployed posture illustrated in FIGS. 1, 2, 7 and 8A and a retracted posture illustrated in FIGS. 3, 4, 5 and 10. In the deployed posture, the ladder main body 18 is extended from the ground towards the walkway 2. The paired hand railings 7 are disposed as safety fences on a climbing up/down part 10 between the ladder main body 18 and the walkway 2. Further, safety fences 8 are disposed on the surrounding of the walkway 2, as illustrated in FIG. 1. Each safety fence 8 includes a plurality of vertical fence members 8a and a plurality of horizontal fence members 8b.

Ladder Main Body

The ladder main body 18 includes a pair of right and left side plates 181, a plurality of steps 18a and a pair of right and left banisters 19. The right and left side plates 181 are disposed away from each other at a predetermined interval. The steps 18a are disposed between the right and left side plates 181. The right and left banisters 19 are fixed to the outer faces of the right and left side plates 181, respectively.

Each of the right and left side plates 181 of the ladder main body 18 includes a first end 181a on the walkway 2 side and a second end 181b on the ground side. The first ends 181a of the right and left side plates 181 are respectively supported while being pivotable up and down about a first pivot shaft A (see FIG. 7) with respect to a vehicle body 1. Therefore, the ladder main body 18 is pivotable about the first pivot shaft A by means of the below-described hydraulic cylinder 4 (see FIG. 6) as an actuator.

Each of the right and left banisters 19 includes a plurality of vertical members 191, a first horizontal member 192 and a second horizontal member 193. The bottom ends of the plural vertical members 191 are fixed to the outer face of the side plate 181 through attachment parts 19a, respectively. The first horizontal member 192 is disposed for coupling the top ends of the plural vertical members 191. The second horizontal member 193 couples the vertically intermediate parts of the plural vertical members 191. The plural vertical members 191 are disposed while the bottom ends thereof are prevented from being downwardly protruded from the corresponding side plate 181 of the ladder main body 18. Further, the first horizontal member 192 is disposed substantially in parallel to the corresponding side plate 181.

It should be noted in the present exemplary embodiment that seven steps 18a are exemplified but the number of the steps 18a is not limited to seven.

Hand Railing

Each of the paired hand railings 7 is formed by bending a pipe or a rod in a roughly triangular shape in a side view. The interval between the paired hand railings 7 is greater than that of the paired banisters 19. This prevents the banisters 19 from interfering with the hand railings 7 when both of the ladder main body 18 and the hand railings 7 are set to be in the retracted state as described below.

Each of the paired hand railings 7 includes a first part 7a, a second part (vertical member) 7b and a third part (horizontal member) 7c. Further, a coupling plate 7d is disposed between the bottom end of the first part 7a and that of the second part 7b.

Figure 5:
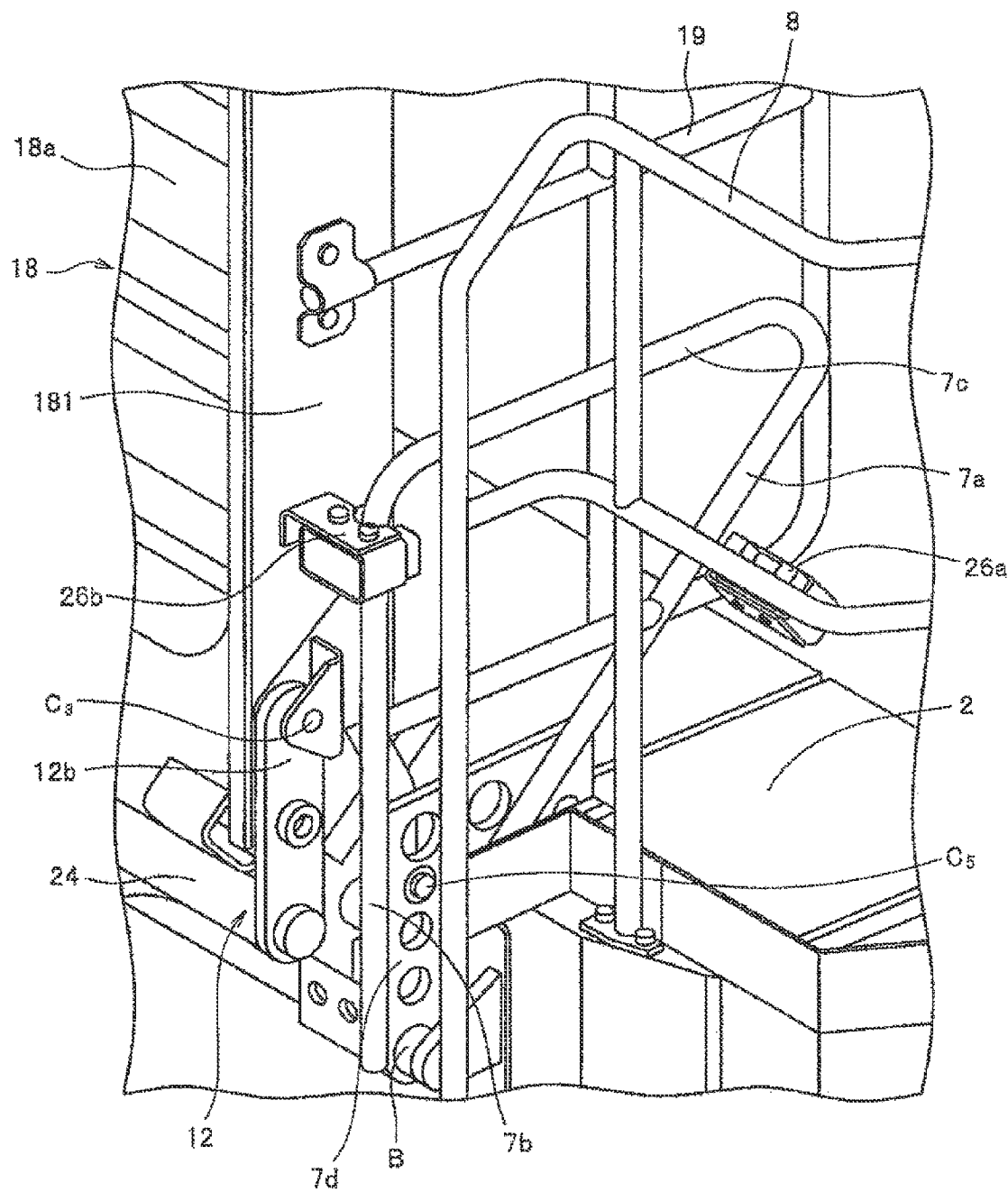
FIG. 5 is a perspective view of major elements illustrating an engaged state of the hand railing in the retracted state.

The first part 7a substantially vertically stands upright while each hand railing 7 takes the deployed posture. The second part 7b is disposed substantially in parallel to the vertical members 191 of each banister 19. The third part 7c is disposed substantially in parallel to the first horizontal member 192 of each banister 19 and each side plate 181 of the ladder main body 18. Further as illustrated in FIG. 5 in detail, the coupling plate 7d is pivotable about a second pivot shaft B while the bottom end thereof, corresponding to that of the second part 7b, is supported by the vehicle body 1 through the second pivot shaft B. The second pivot shaft B is positioned lower than the first pivot shaft A.

It should be noted that clearances are produced between the second parts 7b of the hand railings 7 and the ones, positioned closest to the hand railings 7, of all the vertical members 191 in the respective banisters 19 when the hand railings 7 take the deployed posture. The structure prevents operator's hands and/or the like from getting caught between the hand railings 7 and the banisters 19.

Stopper

The ladder main body 18, the hand railings 7 and the vehicle body 1 are respectively provided with stoppers for fixing them when the ladder main body 18 and the hand railings 7 take either the deployed posture or the retracted posture. The respective stoppers will be hereinafter explained.

Figure 2:
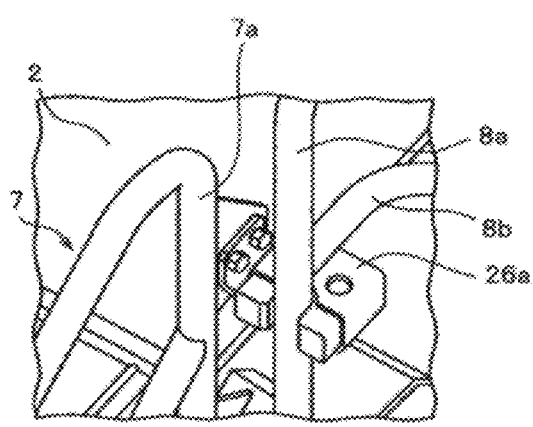
FIG. 2 is a perspective view of major elements illustrating an engaging part between a hand railing of the ladder device and a safety fence.

As illustrated in an enlarged view of FIG. 2, a stopper 26a having an elastic body is attached to a vehicle body-side portion of the first part 7a of each hand railing 7. The elastic body of each stopper 26a includes a recess in the middle part thereof. When the hand railings 7 take the deployed posture, the elastic body of each stopper 26a makes contact with a part, positioned lower than a predetermined horizontal fence member 8b, of a predetermined vertical fence member 8b of each safety fence 8 from the vehicle body side. Further, the predetermined vertical fence member 8a can be fitted into the recess of each elastic body. Thus, wobbling of the hand railings 7 can be prevented by fitting the vertical fence members 8a into the elastic bodies of the stoppers 26a.

Figure 3:
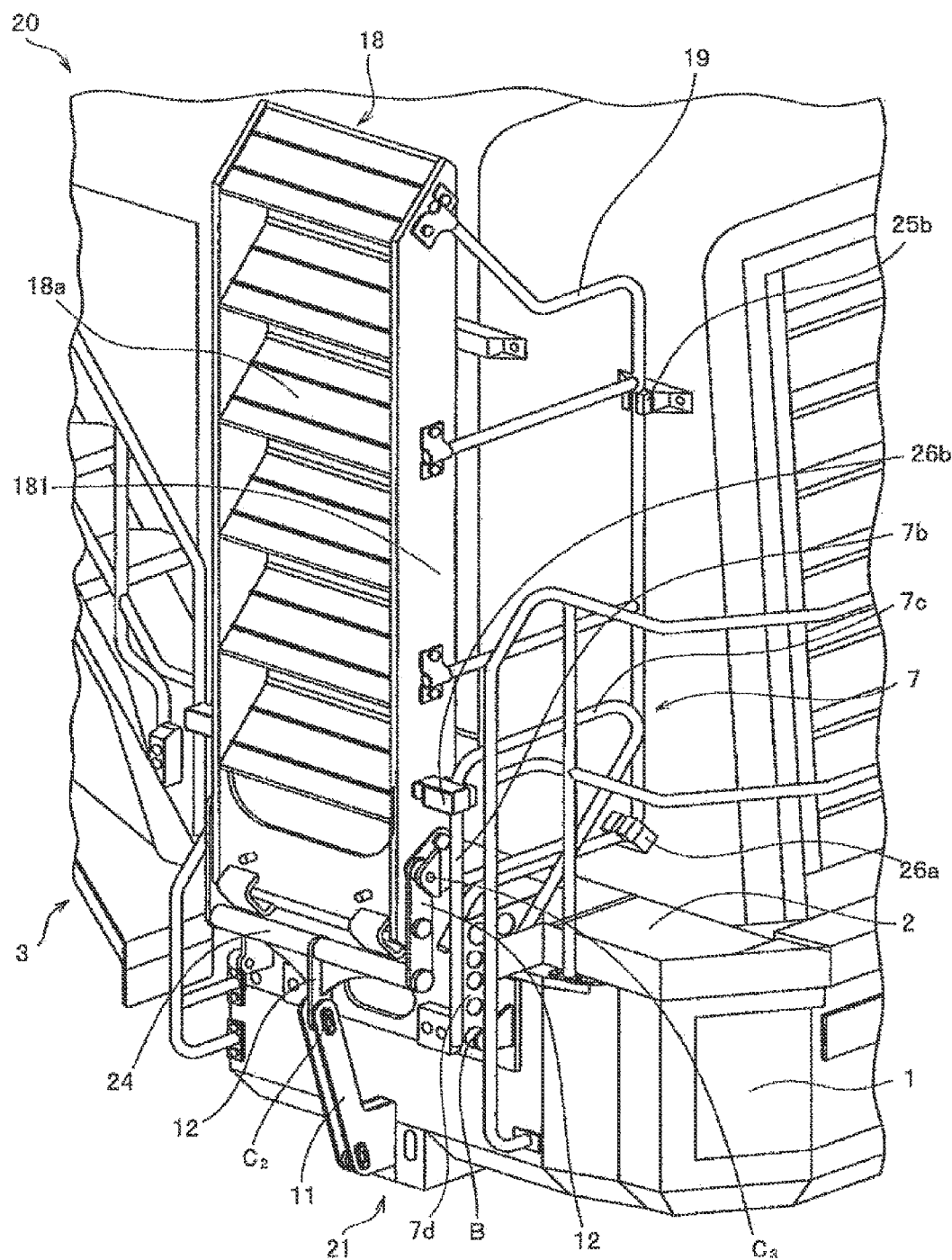
FIG. 3 is a perspective view of major elements illustrating a retracted state of the ladder device.
Figure 4:
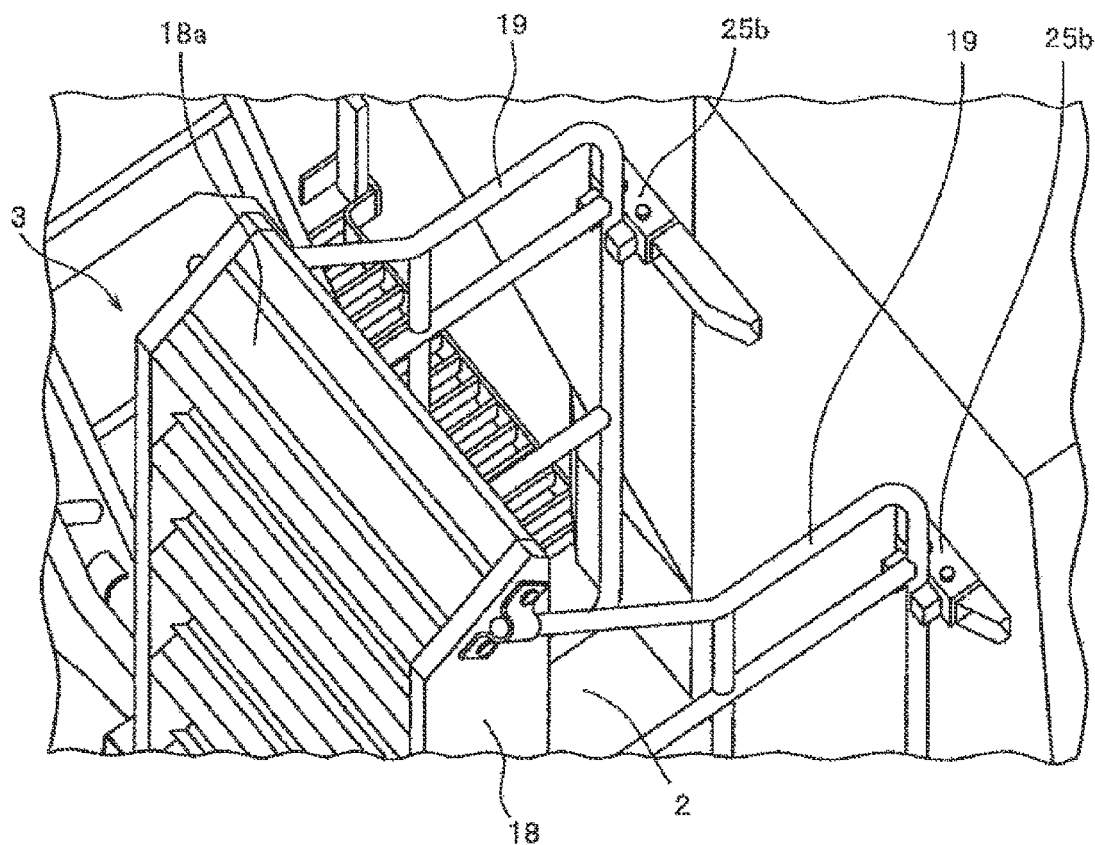
FIG. 4 is a perspective view of major elements illustrating an engaged state of a ladder main body in the retracted state.

Further, as illustrated in FIGS. 3 and 4, the banisters 19 make contact with upper stoppers 25b disposed on the vehicle body side part of the walkway 2 when the ladder main body 18 and the hand railings 7 take the retracted posture. Similarly to each stopper 26a, each upper stopper 25b includes a recess in the middle part thereof and each banister 19, taking the retracted posture, can be fitted into the recess. Thus, wobbling of the ladder main body 18 can be prevented by fitting the banisters 19 into the upper stoppers 25b in retracting the ladder main body 18 and the hand railings 7.

Yet further, as illustrated in FIGS. 3 and 5, stoppers 26b are disposed on the outer faces of the side plates 181 of the ladder main body 18. Each stopper 26b makes contact with the second part 7b of each hand railing 7 when the ladder main body 18 and the hand railings 7 are retracted. Similarly to each stopper 26a of each hand railing 7, each stopper 26b includes a recess in the middle part thereof. The second part 7b of each hand railing 7 taking the retracted posture can be fitted into the recess. Thus, wobbling of the handle rails 7 can be prevented by fitting the second parts 7b of the hand railings 7 into the stoppers 26b in retracting the ladder main body 18 and the hand railings 7.

Figure 8A:
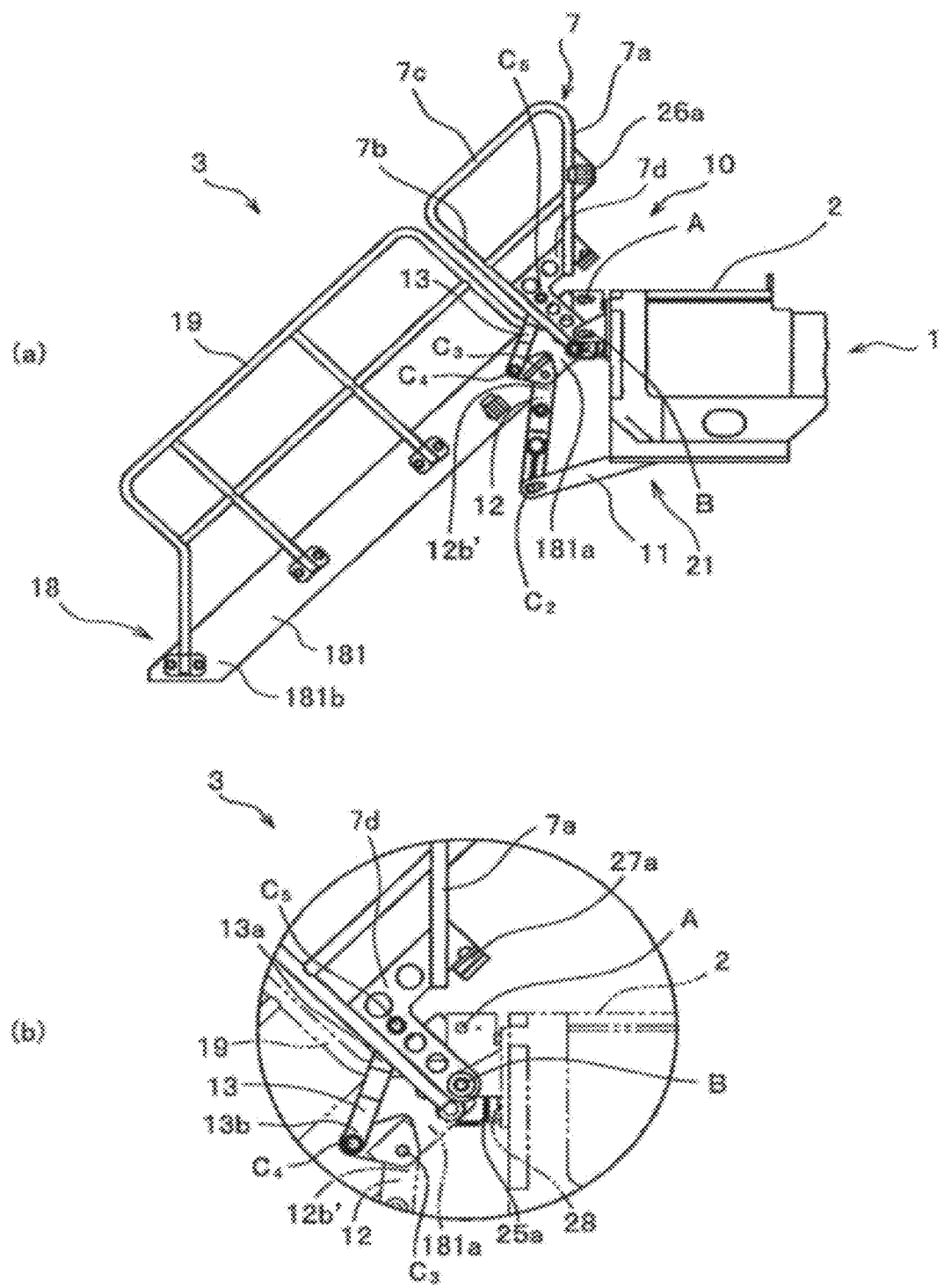
FIG. 8A includes a side view of the deployed state and an enlarged view of major elements related to a first pivot shaft.

Moreover, as illustrated in FIG. 8A(b), stoppers 27a are disposed on the coupling plates 7d of the hand railings 7. Each stopper 27a makes contact with the vehicle body 1 in retracting the hand railings 7. Each stopper 27a includes an elastic body on the front face thereof for relieving impact in making contact with the vehicle body 1.

Pivot Mechanism

With reference to FIGS. 6 to 10, explanation will be made for the pivot mechanism 21 configured to pivot the ladder main body 18 and the hand railings 7 between the deployed posture and the retracted posture. As described above, the pivot mechanism 21 includes single hydraulic cylinder 4 functioning as an actuator for pivoting the ladder main body 18 and the hand railings 7, the first link mechanism 5, the second link mechanism 6 and a pair of coupling members 13.

Hydraulic Cylinder

Figure 6:
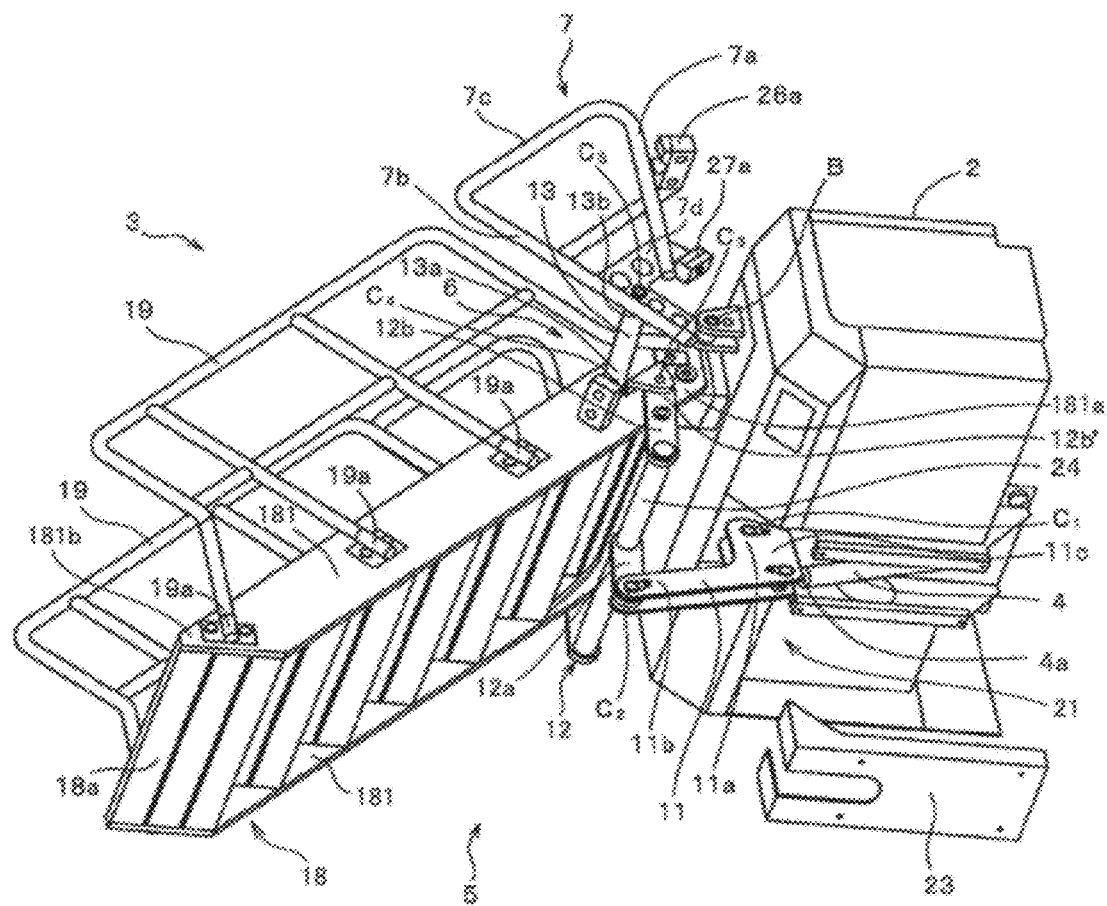
FIG. 6 is a perspective view of major elements illustrating a pivot driving mechanism.

The hydraulic cylinder 4 is disposed below the walkway 2, while the base end thereof is pivotably supported by the vehicle body 1. It should be noted that the axial directions are identical among the pivot shaft of the hydraulic cylinder 4, the first pivot shaft A of the ladder main body 18 and the second pivot shaft B of the hand railings 7. It should be noted that the hydraulic cylinder 4 is covered with a cylinder cover 23 as illustrated in FIG. 6 (note FIG. 6 illustrates a state that the cylinder cover 23 is detached). With the structure, earth and sand are prevented from attaching to the hydraulic cylinder 4.

First Link Mechanism

Figure 7:
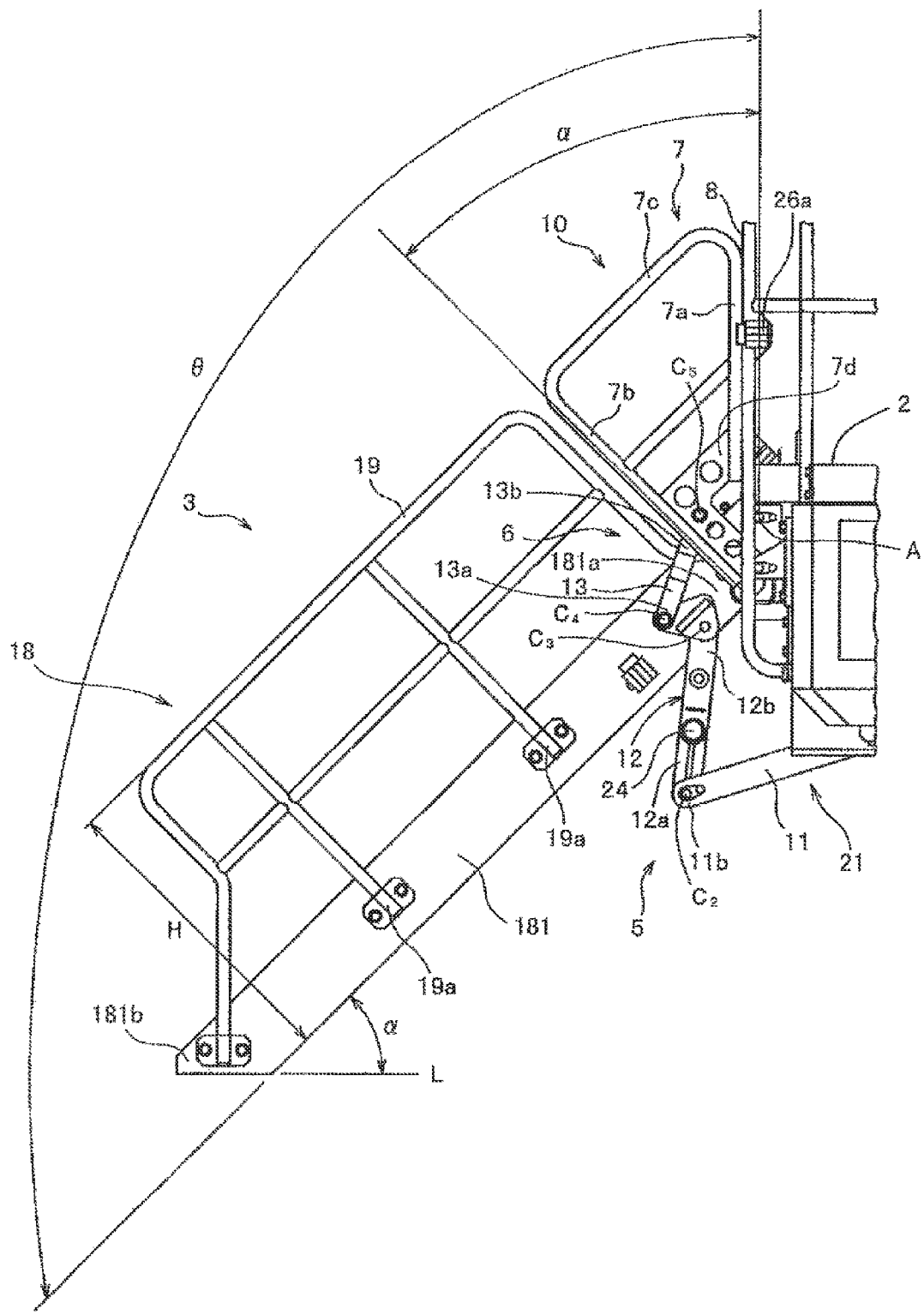
FIG. 7 is a side view of major elements illustrating the structure of a link mechanism.

As illustrated in FIGS. 6 and 7, the first link mechanism 5 includes an L-shaped first link member 11 and a second link member 12. The link members 11 and 12, together with the hydraulic cylinder 4, form a driving mechanism.

The first link member 11 has a first end 11a disposed closer to the vehicle body 1 and a second end 11b disposed away from the vehicle body 1. The first end 11a is pivotably supported by the vehicle body 1 through a shaft C1. Further, the first link member 11 has a bent portion 11c supporting the tip of a piston rod 4a of the hydraulic cylinder 4 in a pivotable state.

As illustrated in FIGS. 3, 7 and etc., the second link member 12 includes single first plate 12a, a linkage 24 and a pair of right and left second plates 12b. The first plate 12a and the right and left second plates 12b are configured to be extended up and down when the ladder main body 18 and the hand railings 7 take the deployed posture. Further, the linkage 24 is extended in parallel to the pivot shafts A and B.

One end of the first plate 12a is pivotably supported by the second end 11b of the first link member 11 through a shaft C2 (first pivot fulcrum). On the other hand, the other end of the first plate 12a is non-pivotably fixed to a longitudinally middle part of the linkage 24. One ends of the right and left second plates 12b are pivotably supported by the outer faces of the side plates 181 of the ladder main body 18 through a shaft C3 (second pivot fulcrum). On the other hand, the other ends of the right and left second plates 12b are non-pivotably fixed to the both ends of the linkage 24. When the ladder main body 18 and etc. take the deployed posture, the shaft C3 is positioned higher than the shafts C1 and C2 while being positioned closer to the ground than the first pivot shaft A is.

Figure 10:
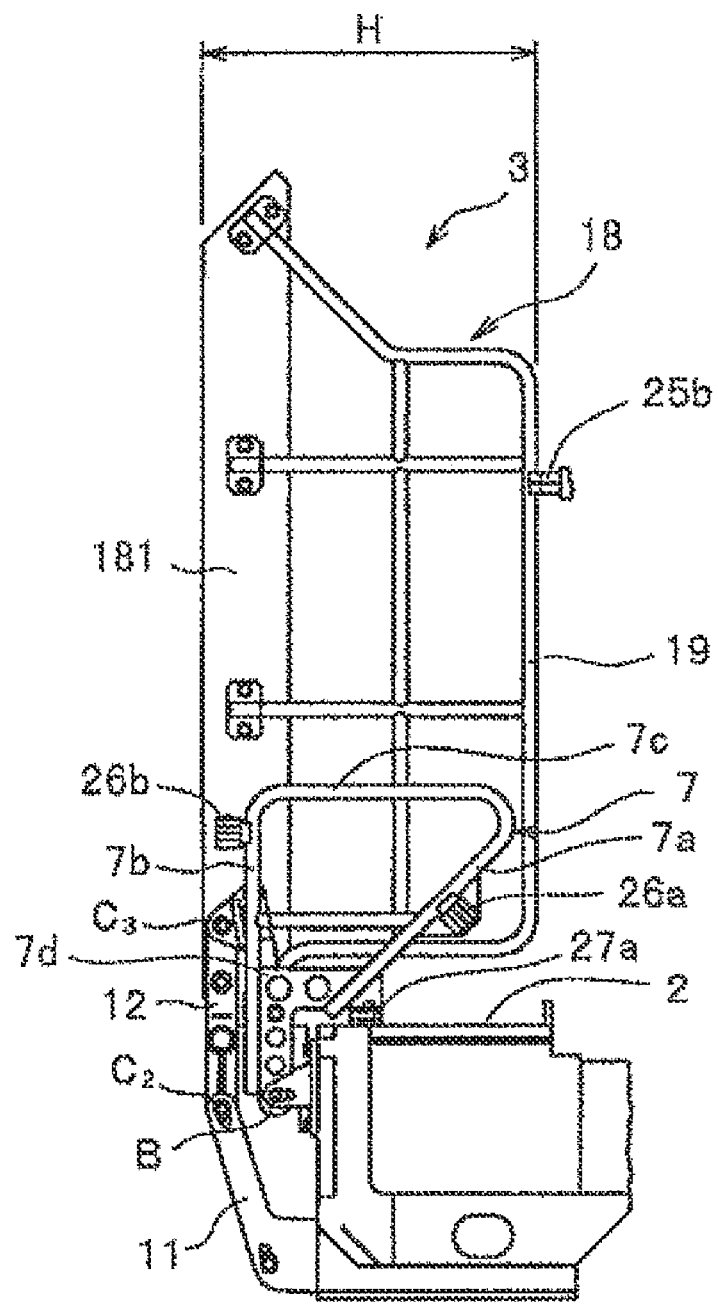
FIG. 10 is a side view illustrating the retracted state.

Further, as illustrated in FIG. 10, the second link member 12 is configured not to be protruded further outward of the vehicle body than the ladder main body 18 is in retracting the ladder main body 18.

Second Link Mechanism

The second link mechanism 6 includes the right and left coupling members 13 for pivotably coupling the ladder main body 18 and the hand railings 7. The right and left coupling members 13 can convert a pivot action of the ladder main body 18 into a pivot action of the hand railings 7. Each coupling member 13 is an elongated plate member disposed between each side plate 181 of the ladder main body 18 and the coupling plate 7d of each hand railing 7. It should be noted that one end (a first end 13a) of the coupling member 13 and the other end (a second end 13b) thereof are unevenly parallel to each other due to a roughly Z-shaped cross-section of the coupling member 13.

The first ends 13a of the coupling members 13 are pivotably supported by the outer surfaces of the side plates 181 of the ladder main body 18 through a shaft C4 (i.e., a ladder side fulcrum). On the other hand, the second ends 13b of the coupling members 13 are pivotably supported by the inner surfaces of the coupling plates 7d of the hand railings 7 through a shaft C5 (i.e., a hand railing side fulcrum). When the ladder main body 18 and etc. take the deployed posture, the shaft C4 is positioned further away from the vehicle body 1 than the shaft C3 is, while being positioned closer to the ground side end of the ladder main body 18 than the shaft C3 is. On the other hand, the shaft C5 is positioned higher than the shaft C3 when the ladder main body 18 and etc. take the deployed posture. The shafts C4 and C5 are both positioned further outward of the vehicle body than the shafts A and B are when the ladder main body 18 and etc. take the deployed posture. Further, the shaft C5 is disposed for positioning a conceptual straight line connecting the second pivot shaft B and the shaft C5 of the hand railings 7 substantially in parallel to the second parts 7b of the hand railings 7. In other words, the conceptual straight line connecting the second pivot shaft B and the shaft C5 intersects with the side plates 181 of the ladder main body 18 substantially at a right angle when the ladder main body 18 takes the deployed posture. By contrast, the conceptual straight line connecting the second pivot shaft B and the shaft C5 is extended in a substantially vertical direction when the ladder main body 18 takes the retracted posture.

Arrangement of Link and Shaft

Figure 8B:
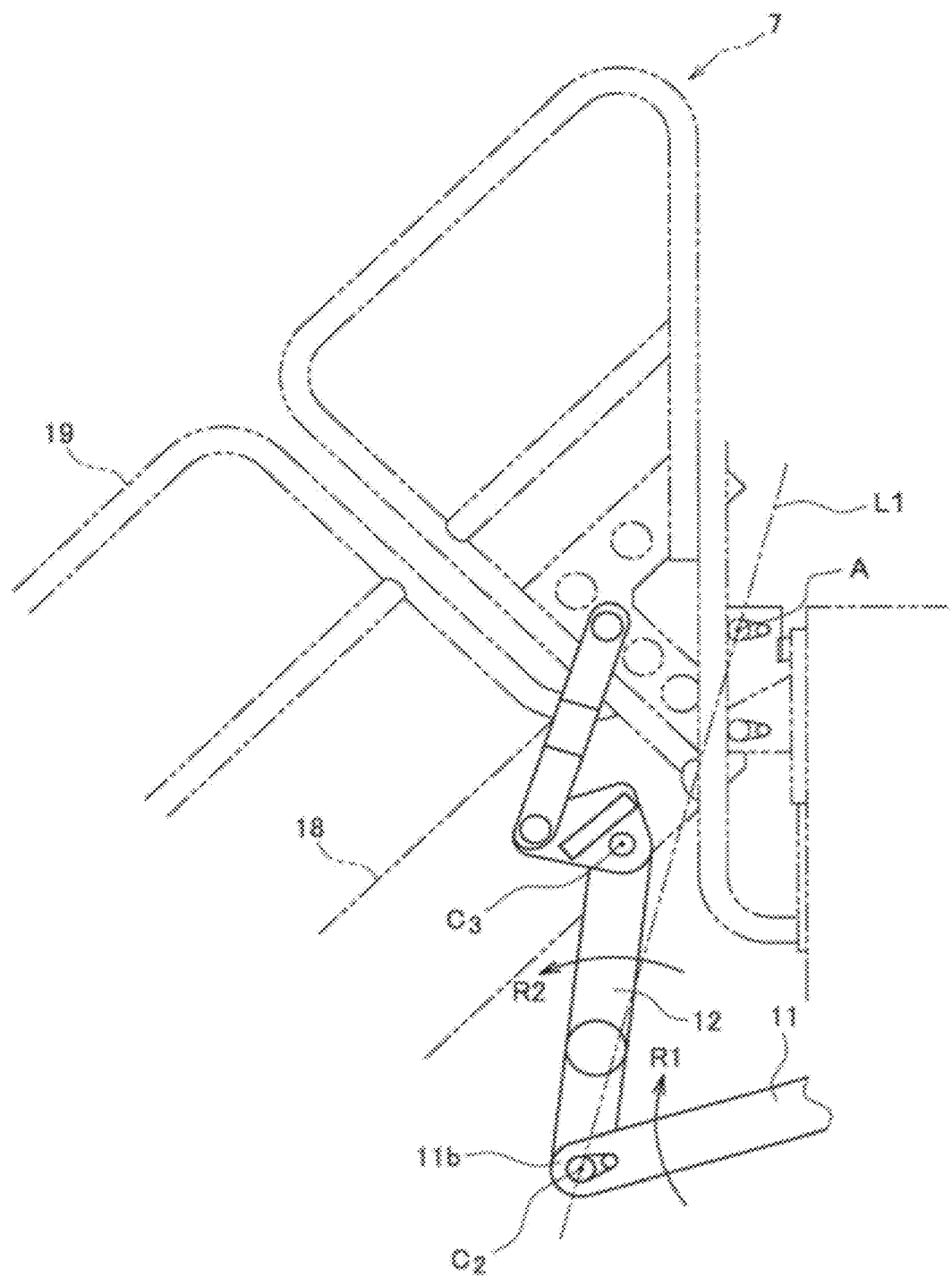
FIG. 8B is an enlarged view of the link mechanism.

First, it is required to dispose the respective shafts for positioning the shaft C3 further away from the vehicle body 1 than a conceptual straight line L1 connecting the first pivot shaft A of the ladder main body 18 and the shaft C2 when the ladder main body 18 takes the deployed posture as illustrated in FIG. 8B. With the arrangement, when the rod of the hydraulic cylinder 4 is extended and the second end 11b of the first link member 11 is thereby pivoted upwards (see an arrow R1 in FIG. 8B), the second link member 12 can start pivoting in the counterclockwise direction (i.e., an arrow R2 in FIG. 8) while the ground-side second ends 181b of the ladder main body 18 can be pivoted upwards. It should be noted that the second link member 12 is configured to pivot in the counterclockwise direction at the start of pivot, but is configured to pivot in the clockwise direction together with the first link member 11 in the course of the pivot of the ladder main body 18 (i.e., a state illustrated in FIG. 9).

Figure 8C:
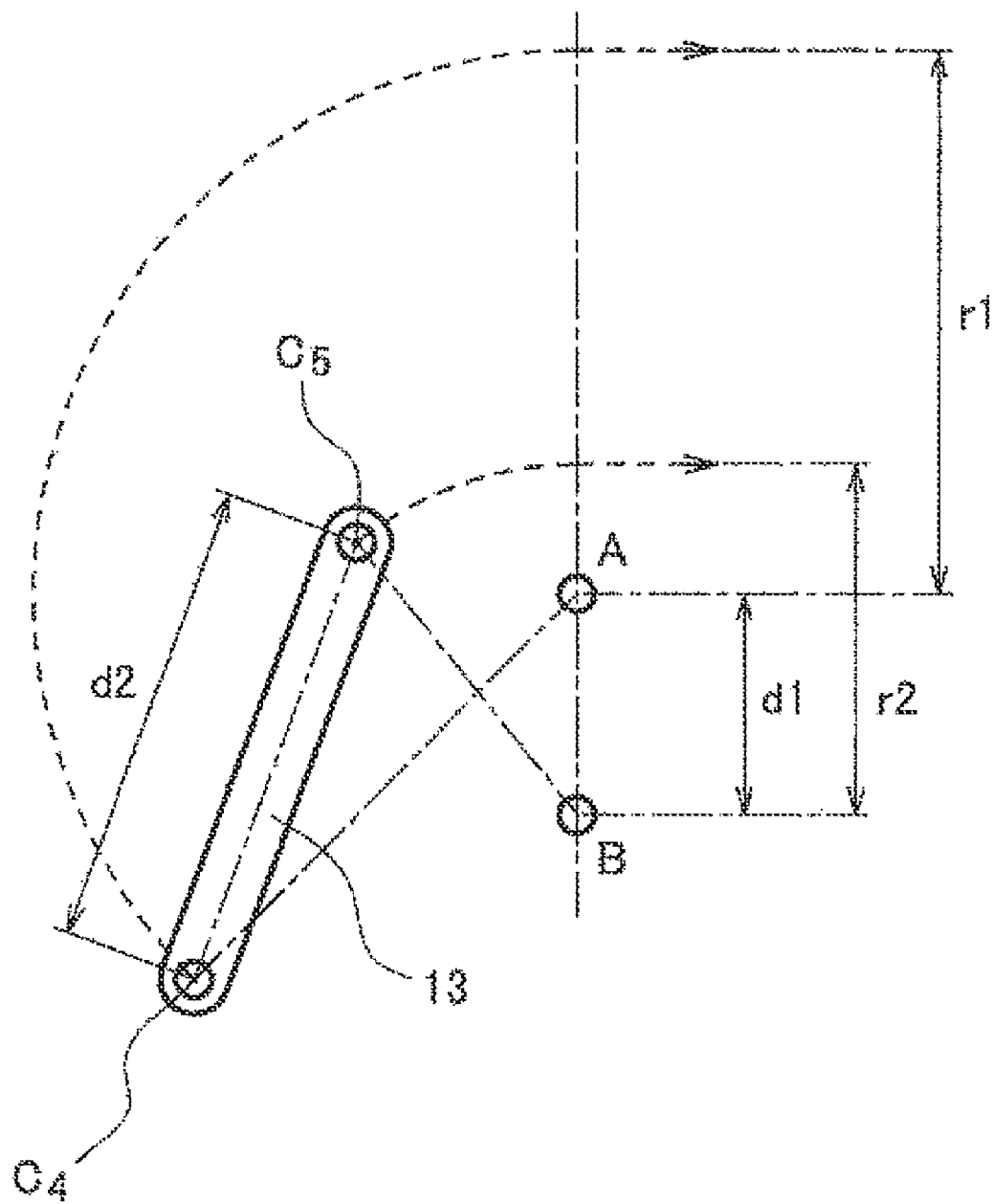
FIG. 8C is a schematic diagram illustrating a relation between shafts and a length of a coupling member and pivot shafts.
Figure 9:
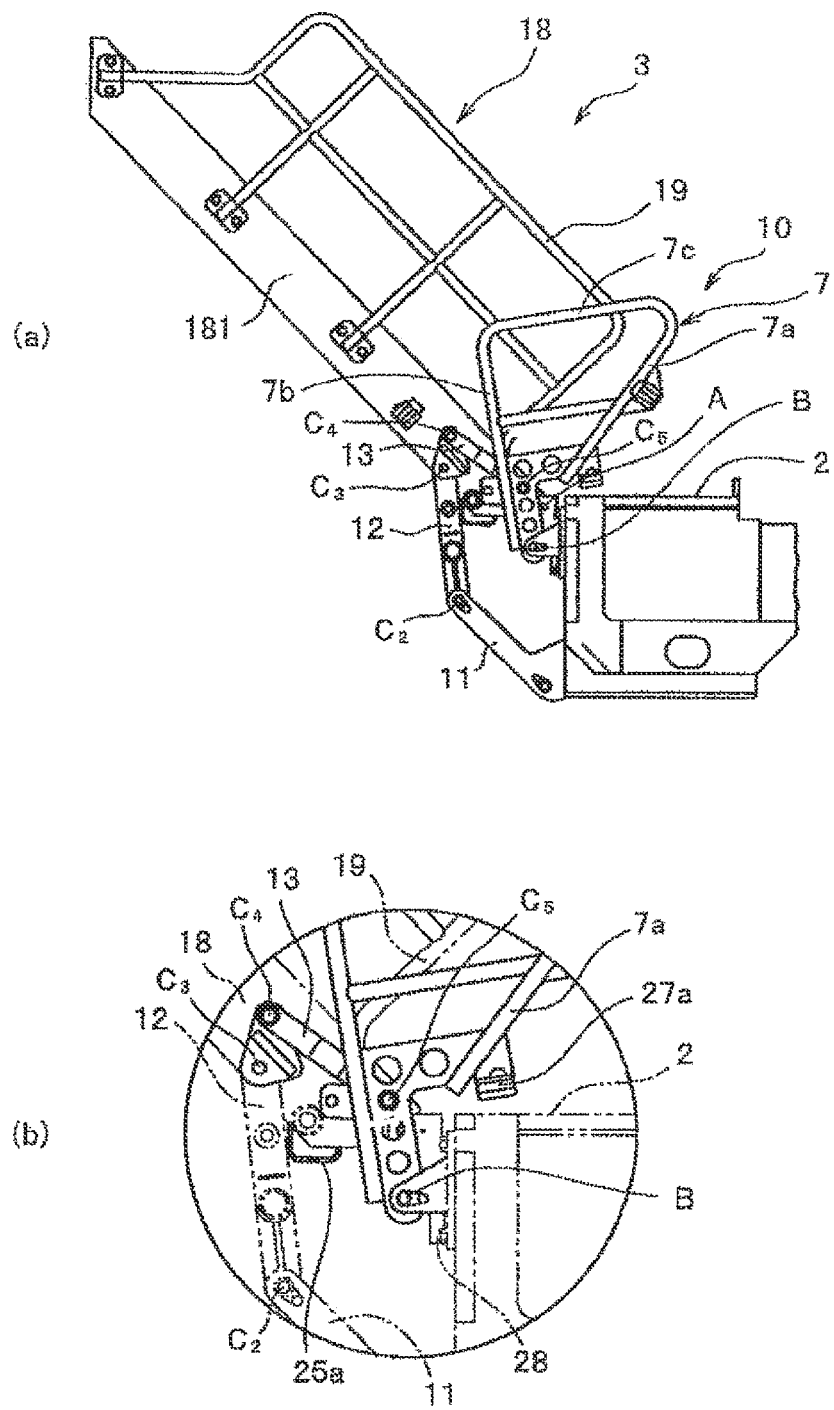
FIG. 9 includes a side view and an enlarged view of major elements related to the first pivot shaft in a transitional phase of pivot.

With reference to FIG. 8C, explanation will be hereinafter made for arrangements of the respective shafts and the length of the coupling member 13 for smoothly pivoting the ladder main body 18 and the hand railings 7 between the deployed posture and the retracted posture.

FIG. 8C is a schematic diagram illustrating relations among the first pivot shaft A of the ladder main body 18, the second pivot shaft B of the hand railings 7, the respective shafts C4 and C5 of the coupling members 13 coupling the ladder main body 18 and the hand railings 7, distance d1 between the shafts A and B, and a projection length d2 of a part of each coupling member 13 between the shafts C4 and C5 in a side view.

As illustrated in FIG. 8C, the ladder body side shaft C4 of the coupling members 13 follows a circular track with a radius r1 about the first pivot shaft A, while the hand railing side shaft C5 thereof follows a circular track with a radius r2 about the second pivot shaft B. Interval between these trajectories is separated most when the pivot shafts A and B of the shafts C4 and C5 are linearly aligned. Therefore, the ladder main body 18 and the hand railings 7 are supposed to smoothly pivot when the length (accurately, the laterally seen projection length) of a part of each coupling member 13 between the shafts C4 and C5 is greater than or equal to the interval between the trajectories under the condition.

Put the aforementioned conditions together, a condition for smoothly pivoting the ladder main body 18 and the hand railings 7 can be expressed with the following equation.

$$d1+r1 \leq d2+r2$$

Where (d1+r1) is herein equal to (d2+r2), the shafts C4 and C5 and the pivot shafts A and B are linearly aligned when the ladder main body 18 pivots at a predetermined angle. Where (d2+r2) is greater than (d1+r1), on the other hand, the hand railings 7 are pressed inwards of the vehicle by the coupling members 13 when the ladder main body 18 takes the retracted state. Where (d1+r1) is greater than (d2+r2), by contrast, the ladder main body 18 and the hand railings 7 are halted in the course of the pivot and cannot take the retracted posture.

In the present exemplary embodiment, an angle of 45 degrees is set as the climbing up/down angle (angle α in FIG. 7) with respect to the horizontal plane of the ladder main body 18 as illustrated in FIG. 7. Further, positions of the shafts C4 and C5 and the length of the coupling member 13 are determined so that when the ladder main body 18 is pivoted at an angle θ (135 degrees in this case), the ladder main body 16 can take an upright posture as illustrated in FIG. 10 while the second parts 7b of the hand railings 7 can similarly take an upright posture and be prevented from protruding outwards of the vehicle body from the ladder main body 18.

Further, as illustrated in FIG. 8A(a), the position of the shaft C5 of the second ends 13b of the coupling members 13, the position of the shaft C3 of a second end 12b' of the second link member 12, and the position of the shaft C2 connecting a first end 12a' of the second link member 12 and the second end 11b of the first link member 11 are roughly linearly aligned in a vertical direction. With the arrangement, the second end 11b of the first link member 11 and the second link member 12 are both roughly linearly moved with respect to the vertical direction when the piston rod of the hydraulic cylinder 4 is protruded from the state illustrated in FIG. 8A (a) and the first link member 11 is thereby pivoted in the clockwise direction. Thus, the push-up force by the first link member 11 can be efficiently upwardly acted on the second end 12b' of the second link member 12 and the first ends 13a of the coupling members 13.

Actions

Next, actions of the ladder main body 18 and the hand railings 7 from the deployed posture to the retracted posture will be explained with reference to FIGS. 8A to 10.

As illustrated in FIG. 8A and etc., the ladder main body 18 and the hand railings 7 take the deployed posture when an operator climbs up the ladder device 3 from the ground to the walkway 2 or climbs down the ladder device 3 from the walkway 2 to the ground. The hand railings 7 are herein disposed in the climbing up/down part 10 between the safety fences 8 and the banisters 19 of the ladder main body 18, while the ladder main body 18 is positioned between the hand railings 7 and the ground.

As illustrated in FIG. 8A(*b*), stoppers 25*a* disposed on the first ends 181*a* of the ladder main body 18 make contact with elastic bodies 28 disposed on the vehicle body 1 when the ladder main body 18 takes the deployed posture.

The hydraulic cylinder 4 is actuated for protruding the piston rod thereof in shifting the posture of the ladder main body 18 and the hand railings 7 from the deployed posture illustrated in FIG. 8A to the retracted posture. The first link member 11 is thereby pivoted about the shaft C1 in the clockwise direction while the second end 11*b* thereof is lifted up. In conjunction, the second link member 12 starts pivoting about the shaft C2 relatively in the counterclockwise direction while being lifted up by the first link member 11. It should be noted that the second link member 12 is pivoted in the clockwise direction in the course of the pivot as described above. Further, in conjunction with movement of the link members 11 and 12, the ladder main body 18 is pivoted about the first pivot shaft A in the clockwise direction while the second ends 181*b*, having been positioned on the ground side, are lifted upwards.

Further, the ladder main body 18 and the hand railings 7 are coupled by the coupling members 13. Therefore, the hand railings 7 are pivoted about the second pivot shaft B in the clockwise direction in conjunction with the pivot of the ladder main body 18. As described above, the hand railings 7 are herein pivoted about the pivot shaft B. On the other hand, the ladder main body 18 is pivoted about the shaft C5 relatively to the hand railings 7 while being pivoted about the pivot shaft A. In other words, the pivot angle of the ladder main body 18 is greater than that of the hand railings 7.

As described above, the pivot angle of the handle rails 7 is less than that of the ladder main body 18. Therefore, the hydraulic cylinder 4 is only required to pivot the hand railings 7 only at a small angle through the first and second link members 11 and 12 and the coupling members 13.

FIG. 7 exemplifies a case that the angle of the ladder main body 18 with respect to the ground is set to be a (e.g., 45 degrees) where a horizontal line parallel to the ground is set as a horizontal line L. In this case, the hand railings 7 are supposed to be pivoted at an angle of $\alpha$ when the ladder main body 18 is pivoted at an angle of $\theta$ (=$\alpha$+90 degrees) between the deployed posture and the retracted posture.

Through the actuation of the hydraulic cylinder 4 as described above, the ladder main body 18 is pivoted only at an angle of "$\alpha$+90 degrees" and can thereby take the retracted posture (i.e., a substantially vertically upright state) as illustrated in FIG. 10. The hand railings 7 are herein pivoted at an angle of $\alpha$ and the second parts 7*b* are similarly set to be in a substantially vertically upright state. Thus, the hand railings 7 can be retracted within a height dimension H enclosed by the banisters 19 and the ladder main body 18 as illustrated in FIG. 10.

In the retracted state of the ladder main body 18 and the hand railings 7, the elastic bodies of the stoppers 27*a* of the hand railings 7 make contact with the vehicle body 1, while the stoppers 26*b* of the ladder main body 18 make contact with the second part 7*b* of the hand railings 7. Further, the banisters 19 of the ladder main body 18 make contact with the upper stoppers 25*b* of the vehicle body 1.

As described above, wobble of the ladder main body 18 and the hand railings 7 can be prevented in the retracted state of the ladder main body 18 and the hand railings 7. Further, the length of the third parts 7*c* of the hand railings 7 is less than the height dimension of the banisters 19 of the ladder main body 18 as illustrated in FIG. 10. The hand railings 7 can be thereby retracted within the height dimension H of the ladder main body 18 including the banisters 19 in a side view. Therefore, the hand railings 7 can be prevented from protruding outside the revolving radius of the vehicle.

Second Exemplary Embodiment

Another exemplary embodiment of the first link mechanism will be explained with reference to FIGS. 11 and 12. The same reference numerals are herein assigned to elements identical to those of the first exemplary embodiment and explanation thereof will be hereinafter omitted.

A hydraulic cylinder 9 is disposed for extending and contracting a piston rod 9*a* in an obliquely upward direction. Further, the base end of the hydraulic cylinder 9 is pivotably supported.

Further, one end (i.e., a first end 11'*a*) of a first link member 11' is supported by the vehicle body 1 through a shaft D1. On the other hand, the other end (i.e., a second end 11'*b*) of the first link member 11' and the tip of the piston rod 9*a* of the hydraulic cylinder 9 are both supported by the same shaft D2.

The second link member 12', having an L-shape in a side view, includes a first plate 12'*a*, a linkage 24 and a pair of right and left second plates 12'*b*. The linkage 24 is extended in parallel to the pivot shafts A and B.

One end of the first plate 12'*a* is pivotably supported by the shaft D2, while the other end thereof is non-pivotably fixed to the longitudinally middle part of the linkage 24. One ends of the right and left second plates 12'*b* are pivotably supported by the outer surfaces of the side plates 181 of the ladder main body 18 through a shaft D3. On the other hands, the other ends of the right and left second plates 12'*b* are respectively non-pivotably fixed to the both ends of the linkage 24. The position of the shaft D3 supported by the ladder main body 18 is disposed closer to the ground than the pivot shaft A supporting the ladder main body 18 is. With thus structured second link member 12', the pivot action of the first link member 11' can be converted into that of the ladder main body 18.

It should be noted that the second link member 12' is herein deigned as a member having an L-shape in a side view but may be formed as a member having roughly vertically elongated shape in a side view. In other words, a member having a vertically elongated shape in a side view may be used as the second link member 12' as long as the shaft D2 is positioned lower than the shaft D3. Even in this case, it is required to configure the second link member 12' not to be protruded further outward of the vehicle body than the ladder main body 18 is in retracting the ladder main body 18.

Further, coupling members 13', coupling the ladder main body 18 and the hand railings 7 in a pivotable state, are structured similarly to the coupling members of the first exemplary embodiment. In other words, a shaft D4 supporting one ends (i.e., first ends 13'*a*) of the coupling members 13' is positioned on a part of the ladder main body 18 closer to the ground than the shaft D3 supporting a second end 12'b' of the second link member 12' with respect to the ladder main body 18 is.

Further, when the ladder main body 18 takes the deployed posture, a shaft D5 supporting the other ends (i.e., second ends 13'b) of the coupling members 13' is positioned on a part of each hand railing 7 higher than the shaft D3 supporting the second end 12'b' of the second link member 12'. Further, the coupling members 13' can convert the pivot action of the ladder main body 18 into that of the hand railings 7.

As to vertical arrangement, the shaft D1 is positioned lower than the shaft D3. Further, the hydraulic cylinder 9 can be disposed while being stored in the vehicle body 1 using a cylinder cover (not illustrated in the figures). Thus, the cylinder cover can prevent earth, sand and etc. from attaching to the hydraulic cylinder 9.

Similarly to the first exemplary embodiment, when the ladder main body 18 takes the deployed posture, the respective shafts are required to be disposed so that the shaft D3 of the second link member 12' can be positioned further outward of the vehicle body 1 than a straight line connecting the first pivot shaft A and the shaft D2 of the ladder main body 18 is.

Further, to smoothly pivot the ladder main body 18 and the hand railings 7 between the deployed posture and the retracted posture, the relation "$d1+r1 \leq d2+r2$" is required to be established among the first pivot shaft A of the ladder main body 19, the second pivot shaft B of the hand railings 7, the respective shafts D4 and D5 of the coupling members 13' coupling the ladder main body 18 and the hand railings 7, the distance d1 between the pivot shafts A and B, and the projection length d2 of a part of each coupling member 13' between the shafts D4 and D5 in a side view.

Figure 11:
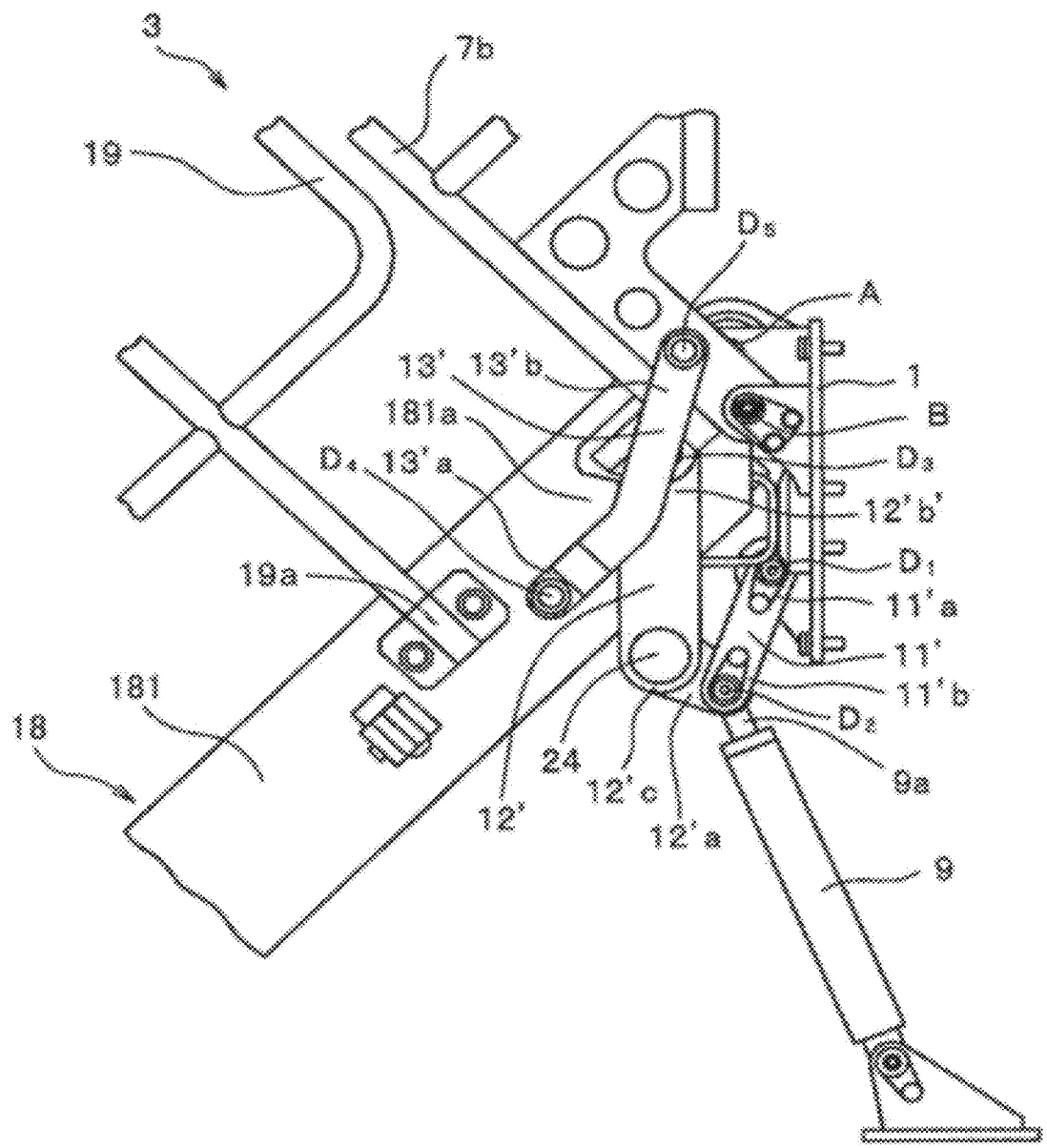
FIG. 11 is a side view illustrating a deployed state set by a pivot driving mechanism according to another exemplary embodiment of the present invention.
Figure 12:
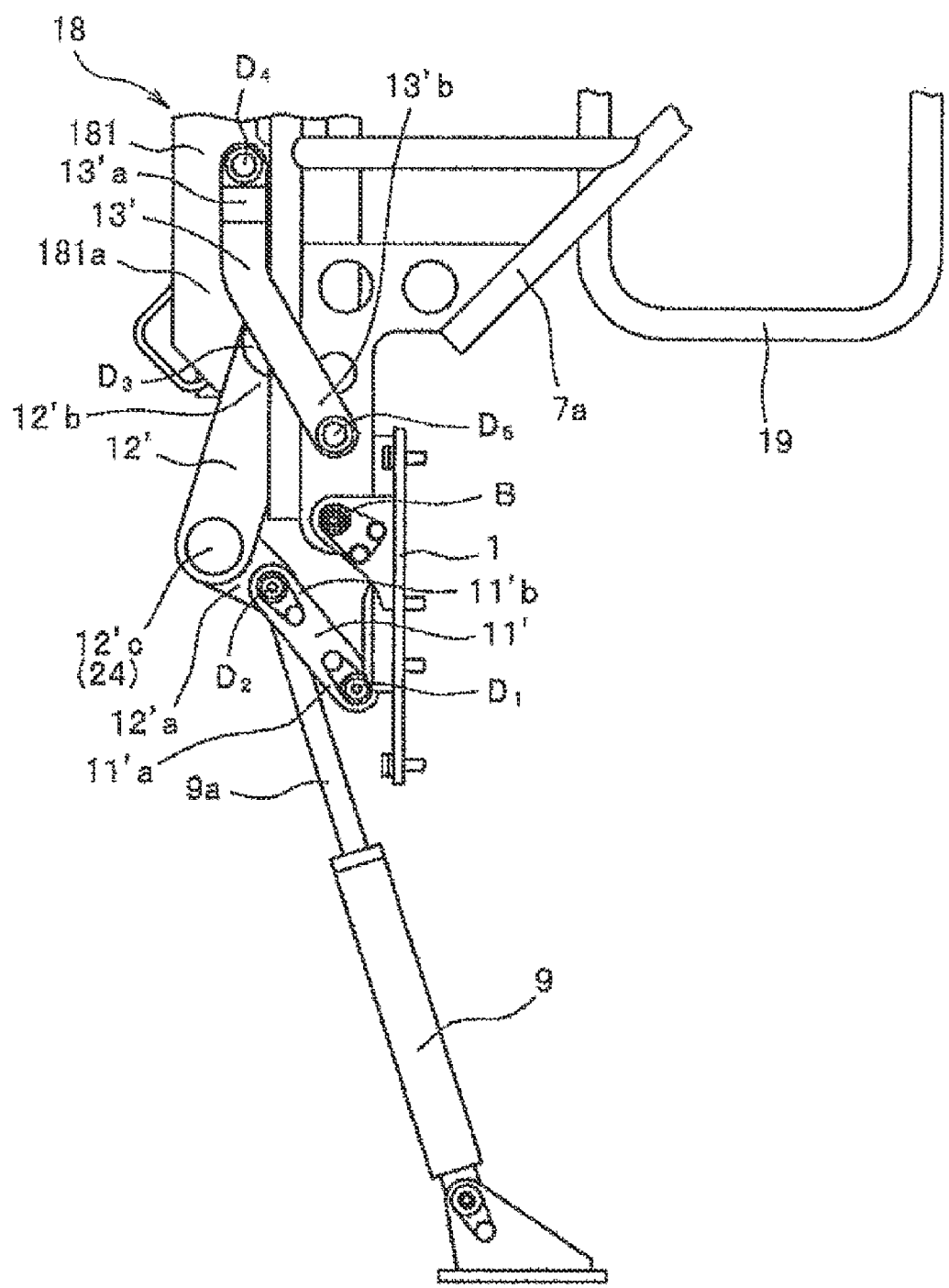
FIG. 12 is a side view illustrating a retracted state set by the pivot driving mechanism of FIG. 11.
Figure 13:
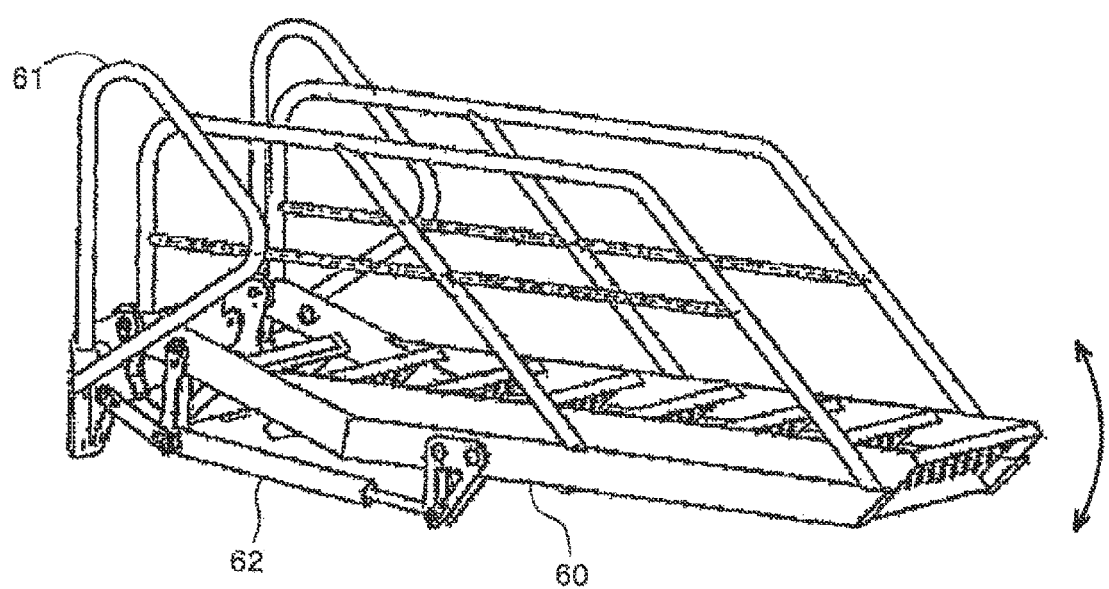
FIG. 13 is a perspective view illustrating a pivot state of a well-known ladder device.

Further, even in the present exemplary embodiment, the ladder main body 18 and the hand railings 7 take the deployed posture when the piston rod 9a of the hydraulic cylinder 9 is retracted as illustrated in FIG. 11. On the other hand, the ladder main body 18 and the hand railings 7 take the retracted posture when the piston rod 9a of the hydraulic cylinder 9 is protruded as illustrated in FIG. 12.

Other Exemplary Embodiments (a) The L-shaped link member 11 having a bent portion has been explained as an exemplary structure of the first link member 11. However, the shape of the first link member 11 is not limited to the L-shape. Any link member formed in an arbitrary shape can be herein used as long as it is structured for preventing linear alignment of three shafts, i.e., the shaft supporting the first end 11a of the first link member 11, the shaft supporting the second end 11b of the first link member 11 and the shaft supporting the tip of the piston rod 4a.

As a link member structured for preventing linear alignment of three shafts, it is possible to employ, for instance, a rectangular-shaped link member that the aforementioned three shafts are positioned in three corner portions thereof, a triangular-shaped link member that the aforementioned three shafts are positioned in the respective vertices.

(b) The shape of the second link member 12' is not limited to the L-shape. The second link member 12' may be structured in an arbitrary shape as long as it can link the shaft D3 positioned higher than the center axis of the hydraulic cylinder 9 and the shaft D2 supporting the piston rod 9a in a pivotable state.

In the structure, actuation force of the hydraulic cylinder is efficiently transmitted to the pivot of the ladder main body and the hand railings. Further, a small hydraulic cylinder can be used as the hydraulic cylinder of the present invention.

Therefore, the driving mechanism for driving and pivoting the ladder main body and the hand railings can be compactly structured.

(c) In the aforementioned exemplary embodiment, a pair of the banisters 19 and a pair of the hand railings 7 are provided. However, a single banister 19 and a single hand railing 7 may be disposed on only either side of the ladder main body 18.

It should be noted in the aforementioned explanation that terms "substantially parallel", "substantially perpendicular", "substantially vertical" and their related terms conceptually include an "accurately parallel" state, an "accurately perpendicular" state and an "accurately vertical" state, and also include slates slanting from the "accurately parallel" state, the "accurately perpendicular" state and the "accurately vertical" state to the extent whereby advantageous effects of the present invention are not deteriorated.

The illustrated embodiments can be preferably applied to a type of construction vehicle including a movable ladder for climbing up and down.

The invention claimed is:

1. A ladder device for a construction machine, the ladder device being of a movable type for climbing up to and climbing down from a walkway mounted on a vehicle body of the construction machine, the ladder device comprising:

a ladder main body of a movable type having a first end and a second end, the first end supported pivotably about a first pivot shaft by the vehicle body the ladder main body configured to take either a deployed posture of positioning the second end on a ground side or a retracted posture of directing the second end upwards;

at least a hand railing of a movable type disposed on at least either of right and left sides of the ladder main body, the hand railing having a bottom end supported pivotably about a second pivot shaft by the vehicle body;

a driving mechanism configured to move the ladder main body between the deployed posture and the retracted posture; and at least a coupling member having a first end and a second end, the first end supported pivotably about a ladder side fulcrum by the ladder main body the second end supported pivotably about a hand railing side fulcrum by the hand railing, the coupling member configured to position the hand railing between the ladder main body and the walkway when the ladder main body takes the deployed posture, the coupling member configured to pivot the hand railing in conjunction with a pivot action of the ladder main body from the deployed posture to the retracted posture, the coupling member configured to position the hand railing further inwards of the vehicle body than the ladder main body is when the ladder main body takes the retracted posture, wherein the walkway is provided with a safety fence, the ladder main body includes: a pair of side plates configured to be extended towards the ground from the walkway when the ladder main body takes the deployed posture; and a pair of banisters respectively supported by the paired side plates, and the hand railing includes: a first part having an engaging portion, the engaging portion configured to be engaged with the safety fence when the ladder main body takes the deployed posture; and a second part disposed adjacent to a corresponding one of the banisters.

2. The ladder device for a construction machine recited in claim 1, wherein both of the ladder side fulcrum and the hand railing side fulcrum of the coupling member are set to be outwards of the vehicle body than the first pivot shaft and the second pivot shaft are when the ladder main body takes the deployed posture, and a sum of a distance between the first pivot shaft and the second pivot shaft and a pivot radius of the ladder side fulcrum of the coupling member about the first pivot shaft is less than or equal to a sum of a side-view length between the ladder side fulcrum and the hand railing side fulcrum of the coupling member and a pivot radius of the hand railing side fulcrum of the coupling member about the second pivot shaft.

3. The ladder device for a construction machine recited in claim 1, wherein the ladder main body is configured to be slanted at a first angle with respect to a horizontal plane when the ladder main body takes the deployed state, the ladder main body configured to be pivoted and raised at an angle obtained by adding an angle of 90 degrees to the first angle when the ladder main body takes the retracted posture, the hand railing includes: a vertical member configured to be positioned adjacent to and extended substantially perpendicular to the ladder main body when the ladder main body takes the deployed posture; and a horizontal member configured to be extended substantially in parallel to the ladder main body when the ladder main body takes the deployed posture, and the vertical member of the hand railing is configured to be positioned further inwards of the vehicle body than the ladder main body is when the ladder main body takes the retracted posture.

4. The ladder device for a construction machine recited in claim 3, wherein a straight line connecting the second pivot shaft and the hand railing side fulcrum is configured to be arranged substantially perpendicularly to the ladder main body when the ladder main body takes the deployed posture, and the straight line connecting the second pivot shaft and the hand railing side fulcrum is configured to be extended in a substantially vertical direction when the ladder main body takes the retracted posture.

5. The ladder device for a construction machine recited in claim 1, wherein the hand railing is configured to be retracted within a height dimension of the ladder main body including the banisters when the ladder main body takes the retracted posture.

6. The ladder device for a construction machine recited in claim 1, wherein the hand railing further includes a stopper having an elastic material, the elastic material configured to make contact with a walkway side member when the ladder main body takes the retracted posture.

7. A ladder device for a construction machine, the ladder device being of a movable type for climbing up to and climbing down from a walkway mounted on a vehicle body of the construction machine, the ladder device comprising:

a ladder main body of a movable type having a first end and a second end, the first end supported pivotably about a first pivot shaft by the vehicle body, the ladder main body configured to take either a deployed posture of positioning the second end on a ground side or a retracted posture of directing the second end upwards;

at least a hand railing of a movable type disposed on at least either of right and left sides of the ladder main body, the hand railing having a bottom end supported pivotably about a second pivot shaft by the vehicle body;

a driving mechanism configured to move the ladder main body between the deployed posture and the retracted posture; and at least a coupling member having a first end and a second end, the first end supported pivotably about a ladder side fulcrum by the ladder main body, the second end supported pivotably about a hand railing side fulcrum by the hand railing, the coupling member configured to position the hand railing between the ladder main body and the walkway when the ladder main body takes the deployed posture, the coupling member configured to pivot the hand railing in conjunction with a pivot action of the ladder main body from the deployed posture to the retracted posture, the coupling member configured to position the hand railing further inwards of the vehicle body than the ladder main body is when the ladder main body takes the retracted posture, wherein the driving mechanism includes:

a hydraulic cylinder having a base end pivotably supported by the vehicle body;

a first link member having a first end and a second end, the first end pivotably supported by the vehicle body, the second end extended outwards of the vehicle body, the first link member configured to be pivoted in conjunction with extension and contraction of the hydraulic cylinder; and a second link member having a first end and a second end, the first end of the second link member supported pivotably about a first pivot fulcrum by the second end of the first link member, the second end of the second link member supported pivotably about a second pivot fulcrum by the ladder main body, the second link member configured to convert a pivot action of the first link member into a pivot action of the ladder main body.

8. The ladder device for a construction machine recited in claim 7, wherein the second pivot fulcrum is positioned further outwards of the vehicle body than a straight line connecting the first pivot shaft and the first pivot fulcrum is when the ladder main body takes the deployed posture.

9. The ladder device for a construction machine recited in claim 7, wherein the second link member is a vertically elongated member for positioning the first pivot fulcrum lower than the second pivot fulcrum in a side view, and the second link member is configured not to be protruded further outwards of the vehicle body than the ladder main body is when the ladder main body takes the retracted posture.

* * * * *